US012606737B2

(12) United States Patent
Hirayama et al.

(10) Patent No.: US 12,606,737 B2
(45) Date of Patent: Apr. 21, 2026

(54) (METH)ACRYLATE MONOMERS AND SEMICONDUCTING LIGHT EMITTING NANOPARTICLES COMPRISING COMPOSITION

(71) Applicant: SAMSUNG ELECTRONICS CO., LTD., Suwon-si (KR)

(72) Inventors: Yuki Hirayama, Tokyo (JP); Tadashi Kishimoto, Tokyo (JP); Atsushi Sawada, Tokyo (JP); Tomohisa Goto, Tokyo (JP); Teruaki Suzuki, Tokyo (JP)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 890 days.

(21) Appl. No.: 17/784,713

(22) PCT Filed: Dec. 9, 2020

(86) PCT No.: PCT/EP2020/085163

§ 371 (c)(1),
(2) Date: Jun. 13, 2022

(87) PCT Pub. No.: WO2021/116139

PCT Pub. Date: Jun. 17, 2021

(65) Prior Publication Data

US 2023/0052397 A1 Feb. 16, 2023

(30) Foreign Application Priority Data

Dec. 12, 2019 (EP) .................................... 19215591
Mar. 18, 2020 (EP) .................................... 20164027
Jun. 10, 2020 (EP) .................................... 20179155

(51) Int. Cl.
*C09K 11/02* (2006.01)
*B82Y 30/00* (2011.01)

(52) U.S. Cl.
CPC ............ *C09K 11/025* (2013.01); *B82Y 30/00* (2013.01)

(58) Field of Classification Search
CPC .............................. C09K 11/025; C09K 11/08
See application file for complete search history.

(56) References Cited

U.S. PATENT DOCUMENTS

| | | | |
|---|---|---|---|
| 10,509,319 B2 | 12/2019 | Suzuki et al. | |
| 10,678,134 B2 | 6/2020 | Hirayama et al. | |
| 10,804,417 B2 | 10/2020 | Pschentizka et al. | |
| 11,269,255 B2 | 3/2022 | Hirayama et al. | |
| 11,746,284 B2 | 9/2023 | Kishimoto et al. | |
| 2017/0205664 A1 | 7/2017 | Cho et al. | |
| 2018/0046080 A1 | 2/2018 | Suzuki et al. | |
| 2018/0102449 A1* | 4/2018 | Pschenitzka | G02F 1/133528 |
| 2020/0157419 A1 | 5/2020 | Kishimoto et al. | |

FOREIGN PATENT DOCUMENTS

| | | | | |
|---|---|---|---|---|
| CN | 109782505 A | 5/2019 | |
| JP | 2017129849 A | 7/2017 | |
| JP | 2018-193525 * | 12/2018 | |
| KR | 10 1746722 B1 | 6/2017 | |
| KR | 10 2019 0062442 A | 6/2019 | |
| KR | 10 2019 0098151 A | 8/2019 | |
| TW | 201829724 A | 8/2018 | |
| TW | 201905163 A | 2/2019 | |
| WO | 2016039079 A1 | 3/2016 | |
| WO | 2016134820 A1 | 9/2016 | |
| WO | 2017054898 A1 | 4/2017 | |
| WO | 2018123821 A1 | 7/2018 | |
| WO | 2019002239 A1 | 1/2019 | |
| WO | WO-2019034380 A1 * | 2/2019 | C08K 9/04 |

OTHER PUBLICATIONS

International Search report PCT/EP2020/085163 dated Feb. 22, 2021 (pp. 1-4).
Office Action in corresponding CN Application No. 202080085853.3 dated Jan. 30, 2024 (pp. 1-7) and English translation thereof (pp. 1-8).
Communication dated Sep. 2, 2025 issued by the Japanese Patent Office in Japanese Patent Application No. 2022-535778.
Communication dated Sep. 17, 2025 issued by the Korean Intellectual Property Office in Korean Patent Application No. 10-2022-7023301.
Communication issued on May 9, 2025 by the Taiwan Intellectual Property Office in Taiwanese Patent Application No. 109143774.

* cited by examiner

*Primary Examiner* — C Melissa Koslow
(74) *Attorney, Agent, or Firm* — Sughrue Mion, PLLC

(57) ABSTRACT

The present invention relates to a composition comprising a (meth)acrylate monomer.

19 Claims, No Drawings

(METH)ACRYLATE MONOMERS AND SEMICONDUCTING LIGHT EMITTING NANOPARTICLES COMPRISING COMPOSITION

FIELD OF THE INVENTION

The present invention relates to a composition comprising at least one (meth)acrylate monomer, use of a composition, an optical element, an optical medium and an optical device.

BACKGROUND ART

WO 2017/054898 A1 describes a composition comprising red emission type nanocrystals, wetting and dispersing agent, propylene glycol monomethyl ether acetate as a solvent, an acryl polymer mixture including an acrylic unit including an acid group and a silane modified acrylic unit.

WO 2019/002239 A1 discloses a composition comprising a semiconducting light emitting nanoparticles, a polymer and a (meth)acrylate such as 1.4. cyclohexanedimethanol-monoacrylate having high viscosity around 90 cp.

PATENT LITERATURE

1. WO 2017/054898 A1
2. WO 2019/002239 A1

SUMMARY OF THE INVENTION

However, the inventors newly have found that there are still one or more of considerable problems for which improvement is desired, as listed below.

improved homogeneous dispersion of semiconducting light emitting nanoparticles in the composition, improved homogeneous dispersion of scattering particles in the composition, preferably improved homogeneous dispersion of both semiconducting light emitting nanoparticles and scattering particles, more preferably improved homogeneous dispersion of semiconducting light emitting nanoparticles and/or scattering particles without solvent; composition having lower viscosity suitable for inkjet printing, preferably a composition which can keep lower viscosity even if it is mixed with high loading of semiconducting light emitting nanoparticles and/or scattering particles, even more preferably without solvent; composition having lower vaper pressure for large area uniform printing; improved QY and/or EQE of semiconducting light emitting nanoparticles in the composition, improved QY and/or EQE of semiconducting light emitting nanoparticles after printing; improved thermal stability; easy printing without clogging at a printing nozzle; easy handling of the composition, improved printing properties; simple fabrication process; improved absorbance of blue light; improved solidity of a later made from the composition after inkjet printing.

The inventors aimed to solve one or more of the above-mentioned problems.

Then it is found a novel composition comprising, essentially consisting of, or consisting of;

i) at least one (meth)acrylate monomer represented by following chemical formula (I), and
ii) another material;

(I)

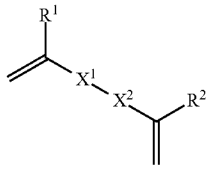

wherein $X^1$ is a non-substituted or substituted alkyl group, aryl group or an alkoxy group or an ester group;
$X^2$ is a non-substituted or substituted alkyl group, aryl group or an alkoxy group or an ester group;
$R^1$ is a hydrogen atom, halogen atom of Cl, Br, or F, methyl group, alkyl group, aryl group, alkoxy group, ester group, or a carboxylic acid group;
$R^2$ is a hydrogen atom, halogen atom of Cl, Br, or F, methyl group, alkyl group, aryl group, alkoxy group, ester group, or a carboxylic acid group;
preferably the symbol $X^1$ is

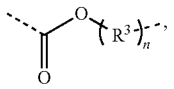

wherein
n is 0 or 1;
preferably the symbol $X^2$ is

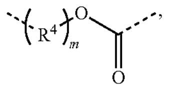

wherein
m is 0 or 1;
preferably at least m or n is 1, more preferably m and n are 1;
$R^3$ is a straight alkylene chain or alkoxylene chain having 1 to 25 carbon atoms, a cycloalkane having 3 to 25 carbon atoms or an aryl group having 3 to 25 carbon atoms, preferably $R^3$ is a straight alkylene chain or alkoxylene chain having 1 to 15 carbon atoms, more preferably 1 to 5 carbon atoms, which may be substituted by one or more radicals $R^a$, where one or more non-adjacent $CH_2$ groups may be replaced by $R^aC{=}CR^a$, C≡C, $Si(R^a)_2$, $Ge(R^a)_2$, $Sn(R^a)_2$, C=O, C=S, C=Se, $C{=}NR^a$, $P({=}O)(R^a)$, SO, $SO_2$, $NR^a$, OS, or $CONR^a$ and where one or more H atoms may be replaced by D, F, Cl, Br, I, CN or $NO_2$;
$R^4$ is a straight alkylene chain or alkoxylene chain having 1 to 25 carbon atoms, a cycloalkane having 3 to 25 carbon atoms or an aryl group having 3 to 25 carbon atoms, preferably $R^4$ is a straight alkylene chain or alkoxylene chain having 1 to 15 carbon atoms, more preferably 1 to 5 carbon atoms, which may be substituted by one or more radicals $R^a$, where one or more non-adjacent $CH_2$ groups may be replaced by $R^aC{=}CR^a$, C≡C, $Si(R^a)_2$, $Ge(R^a)_2$, $Sn(R^a)_2$, C=O, C=S, C=Se, $C{=}NR^a$, $P({=}O)(R^a)$, SO, $SO_2$, $NR^a$, OS, or $CONR^a$ and where one or more H atoms may be replaced by D, F, Cl, Br, I, CN or $NO_2$;

$R^a$ is at each occurrence, identically or differently, H, D or an alkyl group having 1 to 20 carbon atoms, cyclic alkyl or alkoxy group having 3 to 40 carbon atoms, an aromatic ring system having 5 to 60 carbon ring atoms, or a hetero aromatic ring system having 5 to 60 carbon atoms, wherein H atoms may be replaced by D, F, Cl, Br, I; two or more adjacent substituents $R^a$ here may also form a mono- or polycyclic, aliphatic, aromatic or heteroaromatic ring system with one another.

In another aspect, the present invention also relates to a composition comprising, essentially consisting of or consisting of, a polymer derived or derivable from the (meth) acrylate monomers of the composition of the present invention.

In another aspect, the present invention also relates to use of the composition of the present invention in an electronic device, optical device, sensing device or in a biomedical device or for fabricating an electronic device, sensing device, optical device or a biomedical device.

In another aspect, the present invention further relates to an optical element made from the composition.

In another aspect, the present invention further relates to an optical medium comprising, essentially consisting of, or consisting of an optical elements made from the composition or a composition of the present invention.

In another aspect, the present invention also relates to an optical device comprising at least one optical medium of the present invention.

DETAILED DESCRIPTION OF THE INVENTION

According to the present invention, in one aspect, the composition comprises, essentially consisting of, or consisting of, i) at least one (meth)acrylate monomer represented by following chemical formula (I), and
ii) another material;

(I)

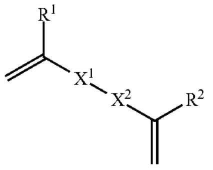

wherein $X^1$ is a non-substituted or substituted alkyl group, aryl group or an alkoxy group or an ester group;

$X^2$ is a non-substituted or substituted alkyl group, aryl group or an alkoxy group or an ester group;

$R^1$ is a hydrogen atom, halogen atom of Cl, Br, or F, methyl group, alkyl group, aryl group, alkoxy group, ester group, or a carboxylic acid group;

$R^2$ is a hydrogen atom, halogen atom of Cl, Br, or F, methyl group, alkyl group, aryl group, alkoxy group, ester group, or a carboxylic acid group;

preferably the symbol $X^1$ is.

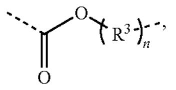

wherein n is 0 or 1;

preferably the symbol $X^2$ is

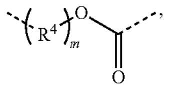

wherein m is 0 or 1;

preferably at least m or n is 1, more preferably m and n are 1;

$R^3$ is a straight alkylene chain or alkoxylene chain having 1 to 25 carbon atoms, a cycloalkane having 3 to 25 carbon atoms or an aryl group having 3 to 25 carbon atoms, preferably $R^3$ is a straight alkylene chain or alkoxylene chain having 1 to 15 carbon atoms, more preferably 1 to 5 carbon atoms, which may be substituted by one or more radicals $R^a$, where one or more non-adjacent $CH_2$ groups may be replaced by $R^aC{=}CR^a$, C≡C, $Si(R^a)_2$, $Ge(R^a)_2$, $Sn(R^a)_2$, C=O, C=S, C=Se, $C{=}NR^a$, $P({=}O)(R^a)$, SO, $SO_2$, $NR^a$, OS, or $CONR^a$ and where one or more H atoms may be replaced by D, F, Cl, Br, I, CN or $NO_2$;

$R^4$ is a straight alkylene chain or alkoxylene chain having 1 to 25 carbon atoms, a cycloalkane having 3 to 25 carbon atoms or an aryl group having 3 to 25 carbon atoms, preferably $R^4$ is a straight alkylene chain or alkoxylene chain having 1 to 15 carbon atoms, more preferably 1 to 5 carbon atoms, which may be substituted by one or more radicals $R^a$, where one or more non-adjacent $CH_2$ groups may be replaced by $R^aC{=}CR^a$, C≡C, $Si(R^a)_2$, $Ge(R^a)_2$, $Sn(R^a)_2$, C=O, C=S, C=Se, $C{=}NR^a$, $P({=}O)(R^a)$, SO, $SO_2$, $NR^a$, OS, or $CONR^a$ and where one or more H atoms may be replaced by D, F, Cl, Br, I, CN or $NO_2$;

$R^a$ is at each occurrence, identically or differently, H, D or an alkyl group having 1 to 20 carbon atoms, cyclic alkyl or alkoxy group having 3 to 40 carbon atoms, an aromatic ring system having 5 to 60 carbon ring atoms, or a hetero aromatic ring system having 5 to 60 carbon atoms, wherein H atoms may be replaced by D, F, Cl, Br, I; two or more adjacent substituents $R^a$ here may also form a mono- or polycyclic, aliphatic, aromatic or heteroaromatic ring system with one another.

Here, the term "(meth)acrylate" is a general term for an acrylate and a methacrylate. Therefore, according to the present invention, the term "(meth)acrylate monomer" means a methacrylate monomer and/or a acrylate monomer.

In a preferred embodiment of the present invention, the viscosity of the composition is 35 cP or less at room temperature, preferably in the range from 1 to 35 cP, more preferably from 2 to 30 cP, even more preferably from 2 to 25 cP.

According to the present invention, said viscosity can be measured by vibration type viscometer VM-10A (SEKONIC) at room temperature. https://www.sekonic.co.jp/english/product/viscometer/vm/vm_series.html (Meth)Acrylate Monomer Represented by Chemical Formula (I) as a Matrix Material It is believed that the lower viscosity is important to make a low viscosity composition suitable for inkjet printing. Therefore, a (meth)acrylate monomer having the viscosity value within the above-mentioned parameter ranges are especially suitable to make a composition for inkjet printing. By using these (meth)acrylate monomer in a composition, when it is mixed with another material such as semiconducting light emitting nanoparticles with high loading, the composition can still keep lower viscosity within the range suitable for inkjet printing.

In a preferred embodiment of the present invention, the boiling point (B.P.) of said (meth)acrylate monomer of chemical formula (I) is 250° C. or more, preferably it is in the range from 250° C. to 350° C., even more preferably from 280° C. to 350° C., further more preferably from 300° C. to 348° C. for large area uniform inkjet printing.

It is believed that said high boiling point is also important to make a composition having a lower vapor pressure preferably less than 0.001 mmHg for large area uniform printing, it is preferable to use a (meth)acrylate monomer of formula (I) having the viscosity value of 25 cP or less at 25° C. and the boiling point at least 250° C. or more, preferably it is in the range from 250° C. to 350° C., more preferably from 300° C. to 348° C. to make a composition suitable for large area uniform inkjet printing even if it is mixed with high loading of another materials such as high loading of semiconducting light emitting nanoparticles.

According to the present invention, said B.P can be estimate by the known method such as like described in Science of Petroleum, Vol. II. p. 1281 (1398), https://www.sigmaaldrich.com/chemistry/solvents/learning-center/nomograph.html.

According to the present invention, any types of publicly available acrylates and/or methacrylates represented by chemical formula (I) can be used preferably.

Especially for the first aspect, any types of publicly available acrylates and/or methacrylates having the viscosity value of 25 cP or less at 25° C. represented by chemical formula (I) can be used.

Furthermore preferably, said $R^3$ of formula (I) and $R^4$ of formula (I) are, each independently of each other, selected from the following groups, wherein the groups can be substituted with $R^a$, preferably they are unsubstituted by $R^a$.

$*—(CH_2)_1—*$ $*—(CH_2)_2—*$ $*—(CH_2)_3—*$ $*—(CH_2)_4—*$ $*—(CH_2)_5—*$ $*—(CH_2)_6—*$ $*—(CH_2)_7—*$

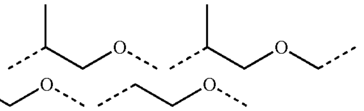

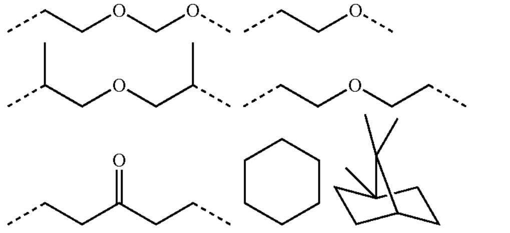

-continued

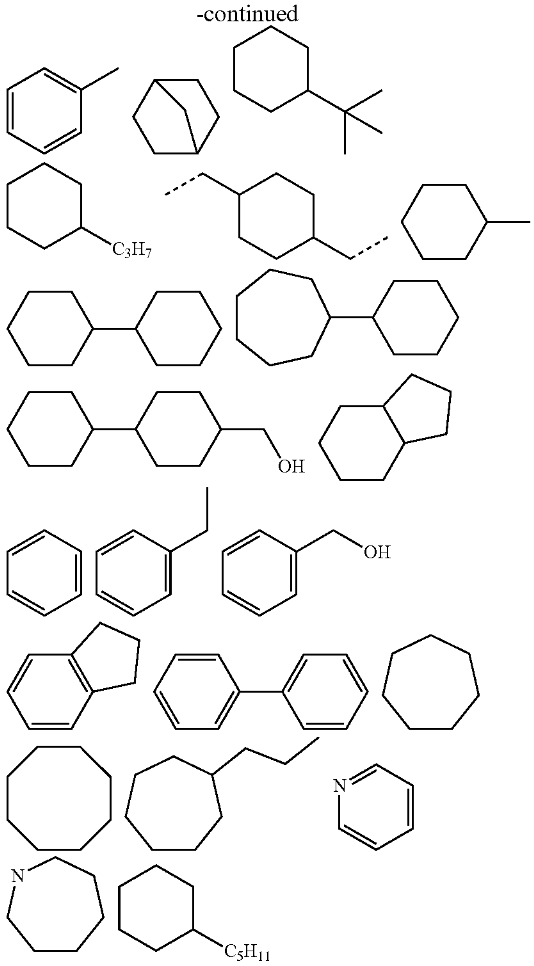

Particularly preferably, said $R^3$ and $R^4$ of formula (I) are, at each occurrence, independently or differently, selected from the following groups.

$*—(CH_2)_1-*$ $*—(CH_2)_2-*$ $*—(CH_2)_3-*$ $*—(CH_2)_4-*$ $*—(CH_2)_5-*$ $*—(CH_2)_6-*$ $*—(CH_2)_7-*$

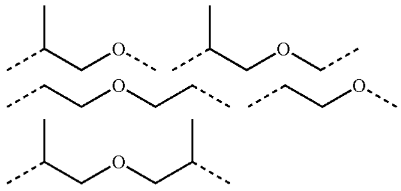

wherein "*" and/or "- - -" represents the connecting point to oxygen atom of the formula or the connecting point to $X^2$ of the formula in case of $R^3$, and wherein "*" and/or "- - -" represents the connecting point to oxygen atom of the formula or the connecting point to $X^1$ of the formula in case of $R^4$.

Furthermore preferably, said formula (I) is NDDA (1,9-nonanediol diacrylate, BP:342° C.), HDDMA (1,6-hexanediol dimethacrylate, BP:307° C.), HDDA (1,6-hexanediol diacrylate, BP:318° C.), NPGDA (neopentyl glycol diacrylate, BP:288° C.) or DPGDA (dipropylene glycol diacrylate, BP: 314° C.).

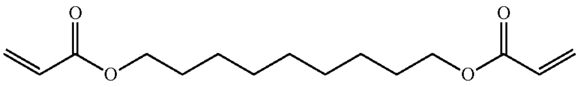

(NDDA)

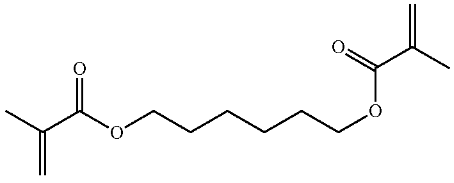

(HDDMA)

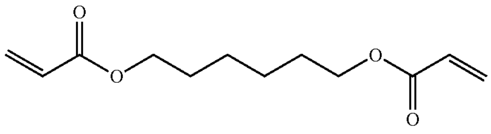

(HDDA)

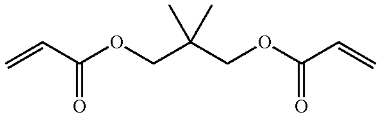

(NPGDA)

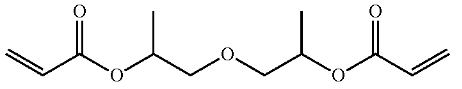

(DPGDA)

Much more preferably said formula (I) is acrylate monomers. Especially NDDA (1,9-nonanediol diacrylate, BP:342° C.), HDDA (1,6-hexanediol diacrylate, BP:318° C.), NPGDA (neopentyl glycol diacrylate, BP:288° C.) or DPGDA (dipropylene glycol diacrylate, BP: 314° C.).

It is believed that these acrylate monomers enable much faster radical polymerization reaction than (metha)crylates, and thus these acrylates can be photo-cured effectively even in the high concentration QM ink in which the efficiency of photo-polymerization is significantly declined by filtering effect.

In some embodiments of the present invention, the composition further comprises another (meth)acrylate monomer represented by following chemical formula (II);

(II)

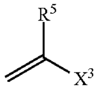

$X^3$ is a non-substituted or substituted alkyl group, aryl group or an alkoxy group;

preferably the symbol $X^3$ is

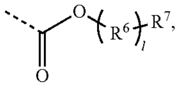

wherein l is 0 or 1;

$R^5$ is a hydrogen atom, halogen atom of CI, Br, or F, methyl group, alkyl group, aryl group, alkoxy group, ester group, or a carboxylic acid group;

$R^6$ is a straight alkylene chain or alkoxylene chain having 1 to 25 carbon atoms, preferably $R^6$ is a straight alkylene chain or alkoxylene chain having 1 to 15 carbon atoms, more preferably 1 to 5 carbon atoms, which may be substituted by one or more radicals $R^a$, where one or more non-adjacent $CH_2$ groups may be replaced by $R^aC{=}CR^a$, C≡C, $Si(R^a)_2$, $Ge(R^a)_2$, $Sn(R^a)_2$, C═O, C═S, C═Se, $C{=}NR^a$, $P({=}O)(R^a)$, SO, $SO_2$, $NR^a$, OS, or $CONR^a$ and where one or more H atoms may be replaced by D, F, Cl, Br, I, CN or $NO_2$;

$R^7$ is a straight alkylene chain or alkoxylene chain having 1 to 25 carbon atoms, preferably $R^7$ is a straight alkylene chain or alkoxylene chain having 1 to 15 carbon atoms, more preferably 1 to 5 carbon atoms, which may be substituted by one or more radicals $R^a$, where one or more non-adjacent $CH_2$ groups may be replaced by $R^aC{=}CR^a$, C≡C, $Si(R^a)_2$, $Ge(R^a)_2$, $Sn(R^a)_2$, C═O, C═S, C═Se, $C{=}NR^a$, $P({=}O)(R^a)$, SO, $SO_2$, $NR^a$, OS, or $CONR^a$ and where one or more H atoms may be replaced by D, F, Cl, Br, I, CN or $NO_2$;

$R^a$ is at each occurrence, identically or differently, H, D or an alkyl group having 1 to 20 carbon atoms, cyclic alkyl or alkoxy group having 3 to 40 carbon atoms, an aromatic ring system having 5 to 60 carbon ring atoms, or a hetero aromatic ring system having 5 to 60 carbon atoms, wherein H atoms may be replaced by D, F, Cl, Br, I; two or more adjacent substituents $R^a$ here may also form a mono- or polycyclic, aliphatic, aromatic or heteroaromatic ring system with one another.

(Meth)Acrylate Monomer Represented by Chemical Formula (II)

It is believed that the (meth)acrylate monomer represented by following chemical formula (II) shows much lower viscosity value than the viscosity of the (meth)acrylate monomer of formula (I). Thus, by using the (meth)acrylate monomer represented by chemical formula (II) in combination of the (meth)acrylate monomer of chemical formula (I), a composition having much lower viscosity desirable for smooth inkjet printing can be realized, preferably without decreasing External Quantum Efficiency (EQE) value.

It is believed that said combination can realize a low viscosity composition comprising high amount of another materials, such as high loading of semiconducting light emitting nanoparticles. Thus, it is especially suitable for an inkjet printing when the composition comprises another material.

In a preferable embodiment of the present invention, the boiling point (B.P.) of said (meth)acrylate monomer of chemical formula (II) is 250° C. or more, preferably the (meth)acrylate monomer of chemical formula (II) is 250° C. or more, more preferably it is in the range from 250° C. to 350° C., even more preferably from 280° C. to 350° C., further more preferably from 300° C. to 348° C. for large area uniform inkjet printing.

In a further preferable embodiment of the present invention, the boiling point (B.P.) of said (meth)acrylate monomer of chemical formula (I) and/or the boiling point (B.P.) of said (meth)acrylate monomer of chemical formula (II) is 250° C. or more, preferably the (meth)acrylate monomers of chemical formula (I) and chemical formula (II) are both 250° C. or more, more preferably it is in the range from 250° C. to 350° C., even more preferably from 280° C. to 350° C., further more preferably from 300° C. to 348° C. for large area uniform inkjet printing.

Furthermore preferably, said $R^7$ of formula (II) is, at each occurrence, independently or differently, selected from the following groups, wherein the groups can be substituted with $R^a$, preferably they are unsubstituted by $R^a$.

| | | |
|---|---|---|
| *—$(CH_2)_6$—$CH_3$ | *—$(CH_2)_7$—$CH_3$ | *—$(CH_2)_8$—$CH_3$ |
| *—$(CH_2)_9$—$CH_3$ | *—$(CH_2)_{10}$—$CH_3$ | *—$(CH_2)_{11}$—$CH_3$ |
| *—$(CH_2)_{12}$—$CH_3$ | *—$(CH_2)_4$—OH | *—$(CH_2)_2$—OH |
| *—$(CH_2)_6$—OH | *—$(CH_2)_3$—OH | *—$(CH_2)_5$—OH |

wherein "*" represents the connecting point to $R^6$ of $X^3$ in case l is 1, and it is representing the connecting point to oxygen atom of $X^3$ of the formula (II) in case n is 0.

The furthermore preferably, said formula (II) is Lauryl methacrylate (LM, viscosity 6 cP, BP: 142° C.) or Lauryl acrylate (LA, viscosity: 4.0 cP, BP: 313.2° C.).

In a preferred embodiment of the present invention, the (meth)acrylate monomer of chemical formula (II) is in the composition and the mixing ratio of the (meth)acrylate monomer of chemical formula (I) to the (meth)acrylate monomer of chemical formula (II) is in the range from 1:99 to 99:1 (formula (I): formula (II)), preferably from 5:95 to 50:50, more preferably from 10:90 to 40:60, even more preferably it is from 15:85 to 35:65, preferably at least a purified (meth)acrylate monomer represented by chemical formula (I) or (II) is used in the composition, more preferably the (meth)acrylate monomer of chemical formula (I) and the (meth)acrylate monomer of chemical formula (II) are both obtained or obtainable by a purification method.

It is believed that the higher amount of the (meth)acrylate monomer of chemical formula (II) to the total amount of the (meth)acrylate monomer of chemical formula (I) leads improved EQE of the composition, and the mixing weight ratio of the (meth)acrylate monomer of chemical formula (II) to the total amount of the (meth)acrylate monomer of chemical formula (I) less than 50 wt. % is preferable from the view point of viscosity of the composition, better ink-jetting properties of the composition.

Preferably, (meth)acrylate monomers purified by using silica column are used.

It is believed that an impurity removal from the (meth) acrylate monomers by the silica column purification leads improved QY of the semiconducting light emitting nanoparticle in the composition.

It is believed that by combining one or more kinds of the bi-(metha)crylate monomers represented by chemical formula (I) and one or more kinds of the (metha)crylate monomer of chemical formula (II), the viscosity of said composition can be controlled, preferably it can be suitably adjusted (lowered) for QD ink jetting.

Especially, it is believed that said combination of one or more kinds of the bi-(metha)crylate monomers represented by chemical formula (I) and one or more kinds of the (metha)crylate monomer of chemical formula (II) is suitably for high loading QM composition for smooth ink-jetting with improved photo curability of the QM ink composition.

In some embodiments of the present invention, the composition further comprises a (meth)acrylate monomer represented by following chemical formula (III);

(III)

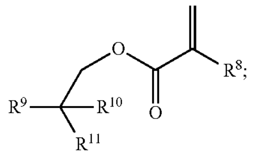

wherein $R^9$ is hydrogen atom, a straight alkyl group having 1 to 25 carbon atoms or a (meth)acryl group represented by chemical formula (IV)

(IV)

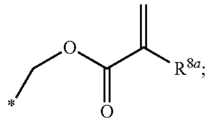

$R^6$ is hydrogen atom, a straight alkyl group having 1 to 25 carbon atoms or a (meth)acryl group represented by chemical formula (V)

(V)

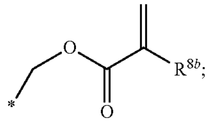

$R^7$ is hydrogen atom, a straight alkyl group having 1 to 25 carbon atoms or a (meth)acryl group represented by chemical formula (VI)

(VI)

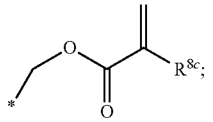

wherein $R^{8a}$, $R^{8b}$ and $R^{8c}$ are, each independently or dependently of each other at each occurrence, H or $CH_3$;

wherein at least one of $R^9$, $R^{10}$ and $R^{11}$ is a (meth)acryl group, preferably two of $R^9$, $R^{10}$ and $R^{11}$ are a (meth) acryl group and other one is a hydrogen atom or a straight alkyl group having 1 to 25 carbon atoms, preferably the electric conductivity (S/cm) of the (meth)acrylate monomer of formula (III) is $1.0*10^{-11}$ or less, preferably it is $5.0*10^{-11}$ or less, more preferably it is in the range from $5.0*10^{-11}$ to $1.0*10^{-15}$, even more preferably it is in the range from $5.0*10^{-12}$ to $1.0*10^{-15}$.

It is believed that the (meth)acrylate monomer of chemical formula (III) is useful to improve its solidity of a later made from the composition after inkjet printing.

According to the present invention, a publicly known a (meth)acrylate monomer represented by following chemical formula (III) can be used to improve solidity of a layer after inkjet printing and cross linking.

Very preferably, Trimethylolpropane Triacrylate (TMPTA) is used as the (meth)acrylate monomer of chemical formula (III).

In a preferable embodiment of the present invention, the amount of the (meth)acrylate monomer of chemical formula (III) based on the total amount of (meth)acrylate monomers in the composition is in the range from 0.001 wt. % to 25 wt. %, more preferably in the range from 0.1 wt. % to 15 wt. %, even more preferably from 1 wt. % to 10 wt. %, further more preferably from 3 to 7 wt %.

Preferably, there (meth)acrylate monomers are purified by using silica column, are used.

It is believed that an impurity removal from the (meth) acrylate monomers by the silica column purification leads improved QY of the semiconducting light emitting nanoparticle in the composition.

According to the present invention, in a preferred embodiment, the viscosity of the composition is 35 cP or less at room temperature, preferably in the range from 1 to 35 cP, more preferably from 2 to 30 cP, even more preferably from 2 to 25 cP.

In a preferred embodiment of the present invention, the composition comprises a solvent 10 wt % or less based on the total amount of the composition, more preferably it is 5 wt % or less, more preferably it is a solvent free composition, preferably the composition does not comprise any one of the following solvent selected from one or more members of the group consisting of ethylene glycol monoalkyl ethers, such as, ethylene glycol monomethyl ether, ethylene glycol monoethyl ether, ethylene glycol monopropyl ether, and ethylene glycol monobutyl ether; diethylene glycol dialkyl ethers, such as, diethylene glycol dimethyl ether, diethylene glycol diethyl ether, diethylene glycol dipropyl ether, and diethylene glycol dibutyl ether; propylene glycol monoalkyl ethers, such as, propylene glycol monomethyl ether (PGME), propylene glycol monoethyl ether, and propylene glycol monopropyl ether; ethylene glycol alkyl ether acetates, such as, methyl cellosolve acetate and ethyl cellosolve acetate; propylene glycol alkyl ether acetates, such as, propylene glycol monomethyl ether acetate (PGMEA), propylene glycol monoethyl ether acetate, and propylene glycol monopropyl ether acetate; ketones, such as, methyl ethyl ketone, acetone, methyl amyl ketone, methyl isobutyl ketone, and cyclohexanone; alcohols, such as, ethanol, propanol, butanol, hexanol, cyclo hexanol, ethylene glycol, triethylene glycol and glycerin; esters, such as, ethyl 3-ethoxypropionate, methyl 3-methoxypropionate and ethyl lactate; and cyclic asters, such as, gamma-butyro-lactone; chlorinated hydrocarbons, such as chloroform, dichloromethane, chlorobenzene, trimethyl benzenes such as 1,3,5-trimethylbenzene, 1,2,4-trimethyl benzene, 1,2,3-trimethyl benzene, docecylbenzene, cyclohexylbenzene, 1,2,3,4-tetramethylbenzene, 1,2,3,5-tetramethylbenzene, 3-isopropylbiphenyl, 3-methylbiphenyl, 4-methylbiphenyl and dichlorobenzene, preferably said solvent is propylene glycol alkyl ether acetates, alkyl acetates, ethylene glycol monoalkyl ethers, propylene glycol, and propylene glycol monoalkyl ethers.

It is believed that the less than 10 wt % of solvent in the composition leads improved ink-jetting and it can avoid $2^{nd}$ or more ink-jetting onto the same pixel after evaporation of the solvent.

According to the present invention, preferably the composition further comprises an another material selected from one or more members of the group consisting of;

- iii) at least one semiconducting light emitting nanoparticle comprising a $1^{st}$ semiconducting nanoparticle, optionally one or more shell layers covering at least a part of the $1^{st}$ semiconducting nanoparticle, preferably said nanoparticle comprises a ligand, more preferably said nanoparticle comprises a alkyl type ligand having carbon atoms 2 to 25, preferably from 6 to 15 (such as C12, C8);
- iv) another (meth)acrylate monomer;
- v) scattering particles, and
- vi) optically transparent polymers, anti-oxidants, radical quenchers, photo initiators and/or surfactants.

In some embodiments of the present invention, preferably the composition of the present invention comprises

- v) scattering particles; and
- vii) at least one polymer configured so that said polymer enables to the scattering particles to disperse in the composition;
- wherein the polymer comprises at least a phosphine group, phosphine oxide group, phosphate group, phosphonate group, thiol group, tertiary amine, carboxyl group, hetero cyclic group, silane group, sulfonic acid, hydroxyl group, phosphonic acid, or a combination of thereof, preferably the polymer comprises a tertiary amine, phosphine oxide group, phosphonic acid, or a phosphate group.

vii) Polymer (Dispersant) Configured so that Said Polymer Enables to the Scattering Particles to Disperse in the Composition According to the present invention, the polymer configured so that said polymer enables to the scattering particles to disperse in the composition comprises at least a repeating unit A comprising a phosphine group, phosphine oxide group, phosphate group, phosphonate group, thiol group, tertiary amine, carboxyl group, hetero cyclic group, silane group, sulfonic acid, hydroxyl group, phosphonic acid, or a combination of thereof, preferably the repeating unit A comprises a tertiary amine, phosphine oxide group, phosphonic acid, or a phosphate group.

In some embodiments of the present invention, the repeating unit A and the repeating unit B are a constitutional repeating unit.

Even more preferably, the repeating unit A comprises a tertiary amine represented by following chemical formula (VII), $$NR^{12}R^{13}R^{14}— \qquad (VII)$$

wherein $R^{12}$ is a hydrogen atom, a straight or a branched alkyl group having 1 to 30 carbon atoms, or an aryl group having 1 to 30 carbon atoms; $R^{13}$ is a hydrogen atom, a straight or a branched alkyl group having 1 to 30 carbon atoms, or an aryl group having 1 to 30 carbon atoms; $R^{12}$ and $R^{13}$ can be same or different of each other; $R^{14}$ is a single bond, a straight or a branched alkylene group having 1 to 30 carbon atoms, alkenylene group having 1 to 30 carbon atoms, (poly) oxaalkylene group having 1 to 30 carbon atoms.

Even more preferably, $R^{12}$ is a straight or a branched alkyl group having 1 to 30 carbon atoms; $R^{13}$ is a straight or a branched alkyl group having 1 to 30 carbon atoms; $R^{12}$ and $R^{13}$ can be same or different of each other.

Furthermore preferably, $R^{12}$ is methyl group, ethyl group, n-propyl group, or n-butyl group; $R^{13}$ is methyl group, ethyl group, n-propyl group, or n-butyl group.

According to the present invention, in a preferred embodiment, the repeating unit A does not contain a salt.

In a preferred embodiment of the present invention, the polymer is a copolymer selected from the group consisting of graft copolymers, block copolymers, alternating copolymers, and random copolymers, preferably said copolymer comprises the repeating unit A, and repeating unit B that does not include any phosphine group, phosphine oxide group, phosphate group, phosphonate group, thiol group, tertiary amine, carboxyl group, hetero cyclic group, silane group, sulfonic acid, hydroxyl group, phosphonic acid, and a combination of thereof, more preferably the copolymer is a block copolymer represented by following chemical formula (VIII) or (IX), $$A_n\text{-}B_m \quad \text{(VIII)}$$

$$B_0\text{-}A_n\text{-}B_m \quad \text{(IX)}$$

wherein the symbol "A" represents a repeating unit A; the symbol "B" is taken to mean the repeating unit B; the symbols "n", "m", and "o" are at each occurrence, independently or dependently of each other, integers 1 to 100, preferably 5 to 75, more preferably 7 to 50; even more preferably the repeating unit B comprises a polymer chain selected from the group consisting of (poly)ethylene, (poly)phenylene, polydivinylbenzene, (poly)ethers, (poly)esters, (poly)amides, (poly)urethanes, (poly)carbonates, polylactic acids, (poly)vinyl esters, (poly)vinyl ethers, polyvinyl alcohols, polyvinylpyrrolidones, celluloses and derivatives of any of these.

In a preferred embodiment of the present invention, the polymer chain of the repeating unit B is a polyethylene glycol.

More preferably, the repeating unit B comprises a chemical structure represented by following chemical formula (X), Chemical formula (X)

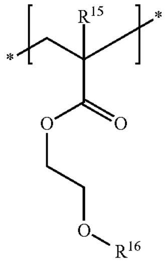

wherein the chemical formula (X), $R^{15}$ is hydrogen atom, or methyl group; $R^{16}$ is alkyl group having 1 to 10 carbon atoms; and n is an integer 1 to 5, "*" represents the connecting point to an another polymer repeating unit or a terminal of the polymer.

Even more preferably, $R^{15}$ can be a hydrogen atom, or methyl group, $R^{16}$ can be an ethyl group, and n is an integer 1 to 5.

In some embodiments of the present invention, the surface of the core, or the outermost surface of one or more shell layers of the semiconducting light emitting nanoparticle can be partly or fully over coated by the polymer. By using ligand exchange method, described in for example, Thomas Nann, Chem. Commun., 2005, 1735-1736, DOI: 10.1039/b-414807j, the polymer can be introduced onto the surface of the core or the outermost surface of the core of the semiconducting light emitting nanoparticle.

According to the present invention, in some embodiments, the content of said polymer is in the range from 1% to 500% by weight, more preferably in the range from 20% to 350% by weight, even more preferably from 50% to 200% by weight with respect to the total weight of the semiconducting light emitting nanoparticle.

In a preferred embodiment of the present invention, the weight average molecular weight (Mw) of the polymer is in the range from 200 g/mol to 30,000 g/mol, preferably from 250 g/mol to 2,000 g/mol, more preferably from 400 g/mol to 1,000 g/mol.

The molecular weight $M_w$ is determined by means of GPC (=gel permeation chromatography) against an internal polystyrene standard.

As the polymer, commercially available wetting and dispersing additives which can be solved in non-polar and/or low polar organic solvent can be used preferably. Such as BYK-111, BYK-LPN6919, BYK-103, BYK-P104, BYK-163 ([trademark], from BYK com), TERPLUS MD1000 series, such as MD1000, MD1100 ([trademark], from Otsuka Chemical), Poly(ethylene glycol) methyl ether amine (Sigma-Ald 767565 [trademark], from Sigma Aldrich), Polyester bis-MPA dendron, 32 hydroxyl, 1 thiol, (Sigma-Ald 767115 [trademark], from Sigma Aldrich), LIPONOL DA-T/25 (From Lion Specialty Chemicals Co.), Carboxymethyl cellulose (from Polyscience etc.), another wetting and dispersing additives disclosed in for examples, "Marc Thiry et. al., ACSNANO, American Chemical society, Vol. 5, No. 6, pp 4965-4973, 2011", "Kimihiro Susumu, et. al., J. Am. Chem. Soc. 2011, 133, pp 9480-9496".

Thus, in some embodiments of the present invention, the composition comprises at least the (meth)acrylate monomer of chemical formula (I), the (meth)acrylate monomer of chemical formula (II) and the polymer configured so that said polymer enables to the scattering particles to disperse in the composition, wherein the mixing ratio of the (meth) acrylate monomer of chemical formula (I): the (meth)acrylate monomer of chemical formula (II): the polymer is 10:89:1 to 50:40:10, preferably in the range from 15:82:3 to 30:60:10.

In some embodiment of the present invention, a composition comprises, essentially consisting of or consisting of, at least a polymer derived or derivable from the (meth)acrylate monomers of the composition of the present invention.

In a preferred embodiment of the present invention, said polymer is derived or derivable from all the (meth)acrylate monomers in the composition, for example, at least the (meth)acrylate monomer of chemical formula (I) and/or the (meth)acrylate monomer of chemical formula (II).

iii) Semiconducting Light Emitting Nanoparticle

According to the present invention, the term "semiconductor" means a material that has electrical conductivity to a degree between that of a conductor (such as copper) and that of an insulator (such as glass) at room temperature. Preferably, a semiconductor is a material whose electrical conductivity increases with the temperature.

The term "nanosized" means the size in between 0.1 nm and 999 nm, preferably 1 nm to 150 nm, more preferably 3 nm to 50 nm.

Thus, according to the present invention, "semiconducting light emitting nanoparticle" is taken to mean that the light emitting material which size is in between 0.1 nm and 999 nm, preferably 1 nm to 150 nm, more preferably 3 nm to 50 nm, having electrical conductivity to a degree between that of a conductor (such as copper) and that of an insulator (such as glass) at room temperature, preferably, a semiconductor is a material whose electrical conductivity increases with the temperature, and the size is in between 0.1 nm and 999 nm, preferably 0.5 nm to 150 nm, more preferably 1 nm to 50 nm.

According to the present invention, the term "size" means the average diameter of the longest axis of the semiconducting nanosized light emitting particles.

The average diameter of the semiconducting nanosized light emitting particles is calculated based on 100 semiconducting light emitting nanoparticles in a TEM image created by a Tecnai G2 Spirit Twin T-12 Transmission Electron Microscope.

In a preferred embodiment of the present invention, the semiconducting light emitting nanoparticle of the present invention is a quantum sized material.

According to the present invention, the term "quantum sized" means the size of the semiconducting material itself without ligands or another surface modification, which can show the quantum confinement effect, like described in, for example, ISBN:978-3-662-44822-9.

For example, CdS, CdSe, CdTe, ZnS, ZnSe, ZnSeS, ZnTe, ZnO, GaAs, GaP, GaSb, HgS, HgSe, HgSe, HgTe, InAs, InP, InPZn, InPZnS, InPZnSe, InPZnSeS, InPZnGa, InPGaS, InPGaSe, InPGaSeS, InPZnGaSeS and InPGa, InCdP, InPCdS, InPCdSe, InSb, AlAs, AlP, AlSb, $Cu_2S$, $Cu_2Se$, $CuInS_2$, $CuInSe_2$, $Cu_2(ZnSn)S_4$, $Cu_2(InGa)S_4$, $TiO_2$ alloys and a combination of any of these can be used.

In a preferred embodiment of the present invention, the $1^{st}$ semiconducting material comprises at least one element of the group 13 of the periodic table, and one element of the group 15 of the periodic table, preferably the element of the group 13 is In, and the element of the group 15 is P, more preferably the $1^{st}$ semiconducting material is selected from the group consisting of InP, InPZn, InPZnS, InPZnSe, InPZnSeS, InPZnGa, InPGaS, InPGaSe, InPGaSeS, InPZnGaSeS and InPGa.

According to the present invention, a type of shape of the core of the semiconducting light emitting nanoparticle, and shape of the semiconducting light emitting nanoparticle to be synthesized are not particularly limited.

For examples, spherical shaped, elongated shaped, star shaped, polyhedron shaped, pyramidal shaped, tetrapod shaped, tetrahedron shaped, platelet shaped, cone shaped, and irregular shaped core and—or a semiconducting light emitting nanoparticle can be synthesized.

In some embodiments of the present invention, the average diameter of the core is in the range from 1.5 nm to 3.5 nm.

The average diameter of the core is calculated based on 100 semiconducting light emitting nanoparticles in a TEM image created by a Tecnai G2 Spirit Twin T-12 Transmission Electron Microscope.

In some embodiments of the present invention, at least one the shell layer comprises or a consisting of a $1^{st}$ element of group 12 of the periodic table and a $2^{nd}$ element of group 16 of the periodic table, preferably, the $1^{st}$ element is Zn, and the $2^{nd}$ element is S, Se, or Te; preferably a first shell layer covering directly onto said core comprises or a consisting of a 1st element of group 12 of the periodic table and a $2^{nd}$ element of group 16 of the periodic table, preferably, the $1^{st}$ element is Zn, and the $2^{nd}$ element is S, Se, or Te.

In a preferred embodiment of the present invention, at least one shell layer (a first shell layer) is represented by following formula (XI), preferably the shell layer directly covering the core is represented by the chemical formula (XI);

$$ZnS_xSe_yTe_z \quad (XI)$$

wherein $0 \le x \le 1$, $0 \le y \le 1$, $0 \le z \le 1$, and $x+y+z=1$, preferably $0 \le x \le 1$, $0 \le y \le 1$, $z=0$, and $x+y=1$, preferably, the shell layer is ZnSe, $ZnS_xSe_y$, $ZnSe_yTe_z$ or $ZnS_xTe_z$.

In some embodiments of the present invention, said shell layer is an alloyed shell layer or a graded shell layer, preferably said graded shell layer is $ZnS_xSe_y$, $ZnSe_yTe_z$, or $ZnS_xTe_z$, more preferably it is $ZnS_xSe_y$.

In some embodiments of the present invention, the semiconducting light emitting nanoparticle further comprises $2^{nd}$ shell layer onto said shell layer, preferably the $2^{nd}$ shell layer comprises or a consisting of a $3^{rd}$ element of group 12 of the periodic table and a 4th element of group 16 of the periodic table, more preferably the $3^{rd}$ element is Zn, and the 4th element is S, Se, or Te with the proviso that the 4th element and the $2^{nd}$ element are not same.

In a preferred embodiment of the present invention, the $2^{nd}$ shell layer is represented by following formula (XI''), $$ZnS_xSe_yTe_z \quad (XI'')$$

wherein $0 \le x \le 1$, $0 \le y \le 1$, $0 \le z \le 1$, and $x+y+z=1$, preferably, the shell layer is ZnSe, $ZnS_xSe_y$, $ZnSe_yTe_z$, or $ZnS_xTe_z$ with the proviso that the shell layer and the $2^{nd}$ shell layer is not the same.

In some embodiments of the present invention, said $2^{nd}$ shell layer can be an alloyed shell layer.

In some embodiments of the present invention, the semiconducting light emitting nanoparticle can further comprise one or more additional shell layers onto the $2^{nd}$ shell layer as a multishell.

According to the present invention, the term "multishell" stands for the stacked shell layers consisting of three or more shell layers.

For example, CdSe/CdS, CdSeS/CdZnS, CdSeS/CdS/ZnS, ZnSe/CdS, CdSe/ZnS, InP/ZnS, InP/ZnSe, InP/ZnSe/ZnS, InZnP/ZnS, InZnP/ZnSe, InZnP/ZnSe/ZnS, InGaP/ZnS, InGaP/ZnSe, InGaP/ZnSe/ZnS, InZnPS/ZnS, InZnPS ZnSe, InZnPS/ZnSe/ZnS, ZnSe/CdS, ZnSe/ZnS or combination of any of these, can be used. Preferably, InP/ZnS, InP/ZnSe, InP/ZnSe/ZnS, InZnP/ZnS, InZnP/ZnSe, InZnP/ZnSe/ZnS, InGaP/ZnS, InGaP/ZnSe, InGaP/ZnSe/ZnS.

Such semiconducting light emitting nanoparticles are publicly available (for example from Sigma Aldrich) and/or can be synthesized with the method described for example in U.S. Pat. Nos. 7,588,828 B, 8,679,543 B and Chem. Mater. 2015, 27, pp 4893-4898.

In some embodiments of the present invention, the composition comprises two or more semiconducting light emitting nanoparticles.

In some embodiments of the present invention, the composition comprises a plurality of semiconducting light emitting nanoparticles.

In some embodiments of the present invention, the total amount of the semiconducting light emitting nanoparticles is in the range from 0.1 wt. % to 90 wt. % based on the total amount of the composition, preferably from 10 wt. % to 70 wt. %, more preferably from 30 wt. % to 50 wt. %.

Ligands

In some embodiments of the present invention, optionally, the semiconducting light emitting nanoparticle can be directly over coated by one or more ligands, or the outer most surface of the inorganic part of the semiconducting light emitting nanoparticle can be directly coated by the additional ligand and the additional ligand is further coated by the polymer.

As the additional ligands, phosphines and phosphine oxides such as Trioctylphosphine oxide (TOPO), Trioctylphosphine (TOP), and Tributylphosphine (TBP); phosphonic acids such as Dodecylphosphonic acid (DDPA), Tridecylphosphonic acid (TDPA), Octadecylphosphonic acid (ODPA), and Hexylphosphonic acid (HPA); amines such as Oleylamine, Dedecyl amine (DDA), Tetradecyl amine (TDA), Hexadecyl amine (HDA), and Octadecyl amine (ODA), Oleylamine (OLA), 1-Octadecene (ODE), thiols such as hexadecane thiol and hexane thiol; mercapto carboxylic acids such as mercapto propionic acid and mercaptoundecanoicacid; carboxylic acids such as oleic acid, stearic acid, myristic acid; acetic acid, Polyethylenimine (PEI), monofunctional PEG thiol (mPEG-thiol) or a derivatives of mPEG thiol and a combination of any of these can be used.

Examples of such ligands have been described in, for example, the laid-open international patent application No. WO 2012/059931A.

v) Scattering Particles

According to the present invention, as the scattering particles, publicly known small particles of inorganic oxides such as $SiO_2$, $SnO_2$, CuO, CoO, $Al_2O_3TiO_2$, $Fe_2O_3$, $Y_2O_3$, ZnO, ZnS, MgO; organic particles such as polymerized polystyrene, polymerized PMMA; inorganic hollow oxides such as hollow silica or a combination of any of these; can be used preferably.

In some embodiments of the present invention, the composition comprises iii) at least one semiconducting light emitting nanoparticle comprising a $1^{st}$ semiconducting nanoparticle, optionally one or more shell layers covering at least a part of the $1^{st}$ semiconducting nanoparticle, preferably the composition has EQE value 23% or more, preferably 24% or more and less than 95%.

According to the present invention, as a transparent polymer, a wide variety of publicly known transparent polymers suitable for optical devices, described in for example, WO 2016/134820A can be used preferably.

According to the present invention, the term "transparent" means at least around 60% of incident light transmit at the thickness used in an optical medium and at a wavelength or a range of wavelength used during operation of an optical medium. Preferably, it is over 70%, more preferably, over 75%, the most preferably, it is over 80%.

According to the present invention the term "polymer" means a material having a repeating unit and having the weight average molecular weight (Mw) 1000 g/mol, or more.

The molecular weight $M_w$ is determined by means of GPC (=gel permeation chromatography) against an internal polystyrene standard.

In some embodiments of the present invention, the glass transition temperature (Tg) of the transparent polymer is 70° C. or more and 250° C. or less.

Tg is measured based on changes in the heat capacity observed in Differential scanning colorimetry like described in http://pslc.ws/macrog/dsc.htm; Rickey J Seyler, Assignment of the Glass Transition, ASTM publication code number (PCN) 04-012490-50.

For example, as the transparent polymer for the transparent matrix material, poly(meth)acrylates, epoxys, polyurethanes, polysiloxanes, can be used preferably.

In a preferred embodiment of the present invention, the weight average molecular weight (Mw) of the polymer as the transparent matrix material is in the range from 1,000 to 300,000 g/mol, more preferably it is from 10,000 to 250,000 g/mol.

According to the present invention, publicly known antioxidants, radical quenchers, photo initiators and/or surfactants can be used preferably like described in WO 2016/134820A.

QY Calculation

Quantum Yield (QY) measurements of composition are carried out by using Absolute PL quantum yield spectrometer C9920-02 (Hamamatsu Photonics K.K.), and following formula is used.

Quantum yield (QY)=emitted photon number from the sample/absorbed photon number of the sample.

Use

In another aspect, the present invention relates to use of the composition, in an electronic device, optical device, sensing device or in a biomedical device or for fabricating an electronic device, sensing device, optical device or a biomedical device.

In another aspect, the present invention also relates to use of composition for inkjet printing, preferably for large area inkjet printing.

Optical Element

In another aspect, the present invention further relates to an optical element made from the composition of the present invention.

Optical Medium

In another aspect, the present invention further relates to an optical medium comprising one or more of said optical elements. Preferably, said optical medium comprises a plurality of the optical elements. For examples, said optical medium comprises a plurality of red, green and blue pixels (red, green and blue optical elements.)

In a preferred embodiment of the present invention, said elements are each separated by bank structure.

In some embodiments of the present invention, the optical medium can be an optical sheet, for example, a color filter, color conversion film, remote phosphor tape, or another film or filter.

According to the present invention, the term "sheet" includes film and/or layer like structured mediums.

In order to enhance out-coupling efficiency from an optical medium comprising the semiconducting light emitting nanoparticle, for example, a quantum sized material containing optical film, several methods are proposed, such as incorporating scattering particles in the film and/or the adjacent films, reduce the refractive index of the film by incorporating hollow silica particles, and placing suitable shape structure (cf. Proceedings of SPIE, P. 184, 5519-33, 2004). Among them, placing the structured film upon the quantum materials containing film is the most suitable for large TV application in which local dimming technique is applied to achieve high dynamic range. The scattering particles are detrimental to the dimming technique, since the scattered light causes a color blur and reducing the refractive index of the film enough for a practical level is difficult because of the limited volume for the hollow silica particles. The combination of reducing the refractive index and placing the structured film can be also applied.

Optical Device

In another aspect, the invention further relates to an optical device comprising the optical medium.

In some embodiments of the present invention, the optical device can be a liquid crystal display device (LCD), Organic Light Emitting Diode (OLED), backlight unit for an optical display, Light Emitting Diode device (LED), Micro Electro Mechanical Systems (here in after "MEMS"), electro wetting display, or an electrophoretic display, a lighting device, and/or a solar cell.

The term "emission" means the emission of electromagnetic waves by electron transitions in atoms and molecules.

Process

In another aspect, the invention also relates to a process for fabricating the composition of the present invention comprising, essentially consisting or consisting of:

a) mixing at least i) at least one (meth)acrylate monomer represented by following chemical formula (I) and ii) another material;

(I)

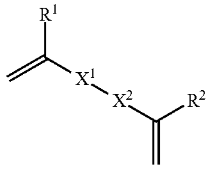

wherein $X^1$ is a non-substituted or substituted alkyl group, aryl group or an alkoxy group;

$R^1$ is a hydrogen atom, halogen atom of CI, Br, or F, methyl group, alkyl group, aryl group, alkoxy group, ester group, or a carboxylic acid group;

$R^2$ is a hydrogen atom, halogen atom of CI, Br, or F, methyl group, alkyl group, aryl group, alkoxy group, ester group, or a carboxylic acid group;

preferably the symbol $X^1$ is

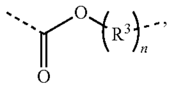

wherein n is 0 or 1;

preferably the symbol $X^2$ is

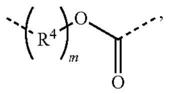

wherein m is 0 or 1;

$R^3$ is a straight alkylene chain or alkoxylene chain having 1 to 25 carbon atoms, a cycloalkane having 3 to 25 carbon atoms or an aryl group having 3 to 25 carbon atoms, preferably $R^3$ is a straight alkylene chain or alkoxylene chain having 1 to 15 carbon atoms, more preferably 1 to 5 carbon atoms, which may be substituted by one or more radicals $R^a$, where one or more non-adjacent $CH_2$ groups may be replaced by $R^aC{=}CR^a$, C≡C, $Si(R^a)_2$, $Ge(R^a)_2$, $Sn(R^a)_2$, C═O, C═S, C═Se, C═$NR^a$, P(═O)($R^a$), SO, $SO_2$, $NR^a$, OS, or $CONR^a$ and where one or more H atoms may be replaced by D, F, Cl, Br, I, CN or $NO_2$;

$R^4$ is a straight alkylene chain or alkoxylene chain having 1 to 25 carbon atoms, a cycloalkane having 3 to 25 carbon atoms or an aryl group having 3 to 25 carbon atoms, preferably $R^4$ is a straight alkylene chain or alkoxylene chain having 1 to 15 carbon atoms, more preferably 1 to 5 carbon atoms, which may be substituted by one or more radicals $R^a$, where one or more non-adjacent $CH_2$ groups may be replaced by $R^aC{=}CR^a$, C≡C, $Si(R^a)_2$, $Ge(R^a)_2$, $Sn(R^a)_2$, C═O, C═S, C═Se, C═$NR^a$, P(═O)($R^a$), SO, $SO_2$, $NR^a$, OS, or $CONR^a$ and where one or more H atoms may be replaced by D, F, Cl, Br, I, CN or $NO_2$;

$R^a$ is at each occurrence, identically or differently, H, D or an alkyl group having 1 to 20 carbon atoms, cyclic alkyl or alkoxy group having 3 to 40 carbon atoms, an aromatic ring system having 5 to 60 carbon ring atoms, or a hetero aromatic ring system having 5 to 60 carbon atoms, wherein H atoms may be replaced by D, F, Cl, Br, I; two or more adjacent substituents $R^a$ here may also form a mono- or polycyclic, aliphatic, aromatic or heteroaromatic ring system with one another, to get a composition.

Preferably said another material is a (meth)acrylate monomer represented by following chemical formula (II);

(II)

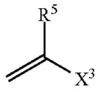

$X^3$ is a non-substituted or substituted alkyl group, aryl group or an alkoxy group;

preferably the symbol $X^3$ is

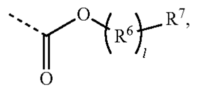

wherein l is 0 or 1;

$R^5$ is a hydrogen atom, halogen atom of CI, Br, or F, methyl group, alkyl group, aryl group, alkoxy group, ester group, or a carboxylic acid group;

$R^6$ is a straight alkylene chain or alkoxylene chain having 1 to 25 carbon atoms, preferably $R^6$ is a straight alkylene chain or alkoxylene chain having 1 to 15 carbon atoms, more preferably 1 to 5 carbon atoms, which may be substituted by one or more radicals $R^a$, where one or more non-adjacent $CH_2$ groups may be replaced by $R^aC{=}CR^a$, C≡C, $Si(R^a)_2$, $Ge(R^a)_2$, $Sn(R^a)_2$, C═O, C═S, C═Se, C═$NR^a$, P(═O)($R^a$), SO, $SO_2$, $NR^a$, OS, or $CONR^a$ and where one or more H atoms may be replaced by D, F, Cl, Br, I, CN or $NO_2$;

$R^7$ is a straight alkylene chain or alkoxylene chain having 1 to 25 carbon atoms, preferably $R^7$ is a straight alkylene chain or alkoxylene chain having 1 to 15 carbon atoms, more preferably 1 to 5 carbon atoms, which may be substituted by one or more radicals $R^a$, where one or more non-adjacent $CH_2$ groups may be replaced by $R^aC{=}CR^a$, C≡C, $Si(R^a)_2$, $Ge(R^a)_2$, $Sn(R^a)_2$, C═O, C═S, C═Se, C═$NR^a$, P(═O)($R^a$), SO, $SO_2$, $NR^a$, OS, or $CONR^a$ and where one or more H atoms may be replaced by D, F, Cl, Br, I, CN or $NO_2$;

$R^a$ is at each occurrence, identically or differently, H, D or an alkyl group having 1 to 20 carbon atoms, cyclic alkyl or alkoxy group having 3 to 40 carbon atoms, an aromatic ring system having 5 to 60 carbon ring atoms, or a hetero aromatic ring system having 5 to 60 carbon atoms, wherein H atoms may be replaced by D, F, Cl, Br, I; two or more adjacent substituents $R^a$ here may also form a mono- or polycyclic, aliphatic, aromatic or heteroaromatic ring system with one another.

Preferably, the mixing ratio of the (meth)acrylate monomer of chemical formula (I) to the (meth)acrylate monomer of chemical formula (II) is in the range from 1:99 to 99:1 (formula (I): formula (II)), preferably from 5:95 to 50:50, more preferably from 10:90 to 40:60, even more preferably it is from 15:85 to 35:65, preferably at least a purified (meth)acrylate monomer represented by chemical formula (I) or (II) is used in the composition, more preferably the (meth)acrylate monomer of chemical formula (I) and the (meth)acrylate monomer of chemical formula (II) are both obtained or obtainable by a purification method.

Thus, in a preferable embodiment of the present invention, the method comprises a purification step of the (meth) acrylate monomers. More preferably, said purification step is taken place before step a).

More details of (meth)acrylate monomers, another material, polymer and scattering particles are described in the section of "(meth)acrylate monomer", "another material", "polymer" and "scattering particle".

Additional additives as described in the section of "additional material" can be mixed.

According to the present invention, it is desirable not to add any solvent to realize large area inkjet printing with improved uniformity without causing any clogging at a nozzle and/or with good dispersity of semiconducting light emitting nanoparticles and/or with good dispersity of scattering particles.

In another aspect, the present invention also relates to a process of fabricating an element or an optical medium comprising;

X) ink jetting the composition of the present invention onto a substrate.

Y) optionally applying photo curing of (meth)acrylate monomer(s) with UV light irradiation.

Technical Effects of the Invention

Present invention provides one or more of the following effects: improved homogeneous dispersion of semiconducting light emitting nanoparticles in the composition, improved homogeneous dispersion of scattering particles in the composition, preferably improved homogeneous dispersion of both semiconducting light emitting nanoparticles and scattering particles, more preferably improved homogeneous dispersion of semiconducting light emitting nanoparticles and/or scattering particles without solvent; composition having lower viscosity suitable for inkjet printing, preferably a composition which can keep lower viscosity even if it is mixed with high loading of semiconducting light emitting nanoparticles and/or scattering particles, even more preferably without solvent; composition having lower vaper pressure for large area uniform printing; improved QY/EQE of semiconducting light emitting nanoparticles in the composition, improved QY/EQE of semiconducting light emitting nanoparticles after printing; improved thermal stability; easy printing without clogging at a printing nozzle; easy handling of the composition, improved printing properties; simple fabrication process; improved absorbance of blue light; improved solidity of a later made from the composition after inkjet printing.

The working examples 1-14 below provide descriptions of the present invention, as well as an in-detail description of their fabrication.

WORKING EXAMPLES

Working Example 1: Preparation of Monomer Mixtures 1,6-Hexanediol dimethacrylate (HDDMA) and lauryl acrylate (LA) are stored over molecular sieves 4A. HDDMA is purified by passed through silica gel column prior to use. 4 g of HDDMA and 6 g of LA are mixed in glass vial, thus obtained a monomer mixture. The weight ratio of HDDMA: LA in the monomer mixture is 40:60.

In a same manner as described above, the monomer mixtures of HDDMA:LA (30:70), HDDMA:LA (20:80), NDDA:LA (30:70) are prepared instead of HDDMA:LA (40:60).

Working Example 2: Preparation of QD Monomer Dispersion 10.41 ml of green Cd-free InP based QD solution in toluene (Merck) and 1.02 g of the monomer mixture obtained in working example 1 are mixed in glass flask. Toluene is evaporated under vacuum at 40 deg. C. by rotary evaporator, thus obtained 3.06 g of QD monomer dispersion.

Working Example 3: Preparation of TiO2 Monomer Dispersion 0.425 g of TiO2 solution and 0.51 g of the monomer mixture obtained in example 1 are mixed in glass flask. n-Octane is evaporated under vacuum at 40 deg. C. by rotary evaporator, thus obtained 0.816 g of TiO2 monomer dispersion.

Working Example 4: Preparation of QD Ink

The QD monomer dispersion obtained in working example 2, the TiO2 monomer dispersion obtained in working example 3, 1.12 g of the monomer mixture obtained in working example 1, 0.051 g of photo initiator (Omnirad 819) and 0.041 g of antioxidant (Irganox 1010) are mixed in glass vial. The obtained mixture is agitated by applying ultrasonic and then by magnetic stirring to afford 5 g of the QD ink. The composition of the QD ink is as below.

Comparative Example 1: Preparation of QD Ink (Comparative Example without Diacrylate Monomer)

The QD ink composition is prepared in the same manner as described in working examples 1 to 4 above except for that TBCH=tert-butylcyclohexyl acrylate and TMPTA=trimethylolpropane triacrylate are used with the following concentration in the composition instead of HDDMA.

| QD | TiO2 | monomer mixture (LA:TBCH:TMPTA 27.5:67.5:5) | photo-initiator | anti-oxidant |
|---|---|---|---|---|
| 40 | 5 | 53.2 | 1 | 0.8 |

(wt. %)

Working Example 5: Fabrication of QD Test Cell for EQE and QY Measurement

The QD inks obtained in working example 4 is injected into a text cell with 15 mm gap and comparative example 5 is also injected into a test cell with same condition and photo-cured by irradiating UV light.

Working Example 6: EQE Measurement

EQE measurement is carried out by using integrating sphere equipped with excitation light by optical fiber (CWL: 450 nm) and spectrometer (C9920, Hamamatsu photonics). To detect the photons of the excitation light, air is used as a reference at room temperature.

The number of photons of light emission from the cell towards the integrating sphere is counted by the spectrometer at room temperature.

EQE is calculated by the following calculation Method.

EQE=Photons [Emission light]/Photons [Excitation light]

Wavelength Range for Calculation

Emission: [Green] 480 nm-600 nm, [Red] 560 nm-680 nm

Table 1 shows the EQE measurement results of the QD ink compositions obtained in working example 4.

TABLE 1

| QD | TiO2 | Monomer mixture | Photo initiator | Anti-oxidant | EQE (%) |
|---|---|---|---|---|---|
| 40 | 5 | 53.2 (HDDMA:LA 40:60) | 1 | 0.8 | 25.2% |
| 40 | 5 | 53.2 (HDDMA:LA 30:70) | 1 | 0.8 | 24.8% |
| 40 | 5 | 53.2 (HDDMA:LA 20:80) | 1 | 0.8 | 24.6% |
| 40 | 5 | 53.2 (NDDA:LA 30:70) | 1 | 0.8 | 24.0% |

(wt. %)
The EQE value of the QD ink composition obtained in the comparative example is 22.7.

Reference Example 1: Preparation of QD Ink

QD ink composition A is prepared in the same manner as described in the working examples 1 to 4 except for that the non-purified (meth)acrylate monomers HDDMA:LA (20:80) are used instead of the purified ones.

The EQE value of QD ink composition A measured in the same manner as described in working example 6, is 23.7.

Reference Example 2: Preparation of QD Ink

QD ink composition B is prepared in the same manner as described in the working examples 1 to 4 except for that the non-purified (meth)acrylate monomers HDDMA:LA (40:60) are used instead of the purified ones.

The EQE value of QD ink composition B measured in the same manner as described in working example 6, is 24.6.

Working Example 7: QY Measurement for Dilute QD Monomer Solution

The sample is prepared by diluting 6.5 ml of green QD solution in toluene (Merck) with 10 ml of monomer mixture. Concentration of the sample is 0.13 mg QD/ml monomer solution. QY is measured in a quartz cuvette with 450 nm excitation by using absolute PL quantum yield measurement system (C9920, Hamamatsu photonics).

Significant improvement in QY is observed by increasing HDDMA ratio in monomer mixture. Surprisingly the QY in 50% HDDMA mixture is even higher than original QY.

| Samples | QY (%) |
|---|---|
| Quantum materials in Toluene solution (original) | 85 |
| QD in HDDMA:LA (20:80) | 83 |
| QD in HDDMA:LA (30:70) | 92 |
| QD in HDDMA:LA (40:60) | 92 |
| QD in HDDMA:LA (50:50) | 98 |

Working Example 8: Preparation of QD Ink

The QD ink composition is prepared in the same manner as described in working examples 1 to 4 above except for that TMPTA is also used with LA and HDDMA as mentioned below.

| QD | TiO2 | Monomer mixture (LA:HDDMA:TMPTA 85:10:5) | photo-initiator | anti-oxidant |
|---|---|---|---|---|
| 40 | 5 | 53.2 | 1 | 0.8 |

(wt. %)

Working Example 9: Fabrication of Test Cells and Wiping Test

The QD inks obtained in working example 4 and QD ink obtained in working example 8 are spin coated onto a glass substrates at 400 rpm for 20 sec. and it is photo-cured by irradiating UV light at 380 mJ or at 760 mJ under $N_2$ condition through a quartz glass.

For photo-curing, 395 nm LED flashlight, 6.3 mW/cm$^2$ (FWHM 10 nm) was used.

The surface of the obtained samples are wiped by hand with a clean swab.

Table 2 shows the results of the wiping test.

| QD | TiO2 | Monomer mixture | Photo initiator | Anti-oxidant | 380 mJ | 760 mJ |
|---|---|---|---|---|---|---|
| 40 | 5 | 53.2 (HDDMA: LA 40:60) | 1 | 0.8 | Good | Good |
| 40 | 5 | 53.2 (HDDMA: LA 30:70) | 1 | 0.8 | Good | Good |
| 40 | 5 | 53.2 (HDDMA: LA 20:80) | 1 | 0.8 | Poor (very soft) | Good |
| 40 | 5 | (LA:HDDMA: TMPTA 85:10:5) | 1 | 0.8 | Good | Good |

Working Example 10: QD Ligand Exchange

Cd-free InP based QDs (Merck) are mixed with 7.5 wt % or 50 wt % of Mono(2-acryloyloxyethyl)succinate (CAS: 50940-49-3 from Tokyo Kasei) based on the total amount of QDs in $CHCl_3$ for 1 hour at 40 deg. C. Cleaning with in $CHCl_3$-MeOH is carried out.

Working Example 11: Preparation of QD Ink

The QD ink composition is prepared in the same manner as described in working examples 1 to 4 above except for that the QDs with Mono(2-acryloyloxyethyl)succinate (Hereafter "AES") obtained from working example 10 are used with LA and HDDMA as mentioned below.

| QD | TiO2 | Monomer mixture (LA:HDDMA 70:30) | photo-initiator | anti-oxidant |
|---|---|---|---|---|
| 40 | 5 | 53.2 | 1 | 0.8 |

No significant viscosity increase for 3 days is observed.

Instead of HDDMA, DPGDA or NDDA can be used preferably.

Instead of AES, known thiol acrylates can also be used.

Working Example 12: Fabrication of QD Test Cell

The QD ink obtained in working example 11 is injected into a text cell with 15 mm gap and photo-cured by irradiating UV light.

The content of AES in the cured QD ink is 3.2 wt. % based on the total amount of cured QD ink in the test cell. The test cell is very clear.

According to the TEM analysis, a smooth layer structure without any void in a cured ink and without any aggregation in the cured ink is observed.

Working Example 13: Preparation of QD Ink and Fabrication of QD Test Cell

The QD ink composition is prepared in the same manner as described in working example except for that no TiO2 particles are used.

And QD test cells are fabricated and EQE is measured in the same manner as described in working example 5 and 6 except for that the QD ink obtained in working example 13 is used.

Below table shows the results of the measurements.

| | PWL(nm) | FWHM(nm) | EQE(%) |
|---|---|---|---|
| AES 7.5 w % Before UV cure | 528 | 34 | 6.9 |
| AES 7.5 w % After UV cure | 530 | 35 | 6.7 |
| AES 50 w % Before UV cure | 529 | 34 | 6.8 |
| AES 50 w % After UV cure | 529 | 34 | 6.4 |

Working Example 14: Preparation of Monomer Mixtures

The monomer mixtures of HDDA (1,6-hexanediol diacrylate) and LA, and NPGDA (neopentylglycol diacrylate) and LA are prepared in the same manner as described in working example 1 except for that HDDA and NPGDA are used instead of HDDMA.

The invention claimed is:

1. A composition comprising:

at least one (meth)acrylate monomer represented by chemical formula (I), at least one (meth)acrylate monomer represented by chemical formula (II), at least one semiconducting light emitting nanoparticle comprising a $1^{st}$ semiconducting nanoparticle, optionally with one or more shell layers covering at least a part of the $1^{st}$ semiconducting nanoparticle, scattering particles, and at least one polymer configured to enable the scattering particles to disperse in the composition, wherein a mixing ratio of the (meth)acrylate monomer of chemical formula (I): the (meth)acrylate monomer of chemical formula (II): the polymer is 10:89:1 to 50:40:10;

(I)

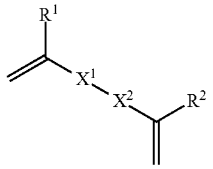

wherein $X^1$ is a non-substituted or substituted alkyl group, aryl group or an alkoxy group or an ester group;

$X^2$ is a non-substituted or substituted alkyl group, aryl group or an alkoxy group or an ester group;

$R^1$ is a hydrogen atom, Cl, Br, or F, methyl group, alkyl group, aryl group, alkoxy group, ester group, or a carboxylic acid group; and $R^2$ is a hydrogen atom, Cl, Br, or F, methyl group, alkyl group, aryl group, alkoxy group, ester group, or a carboxylic acid group;

(II)

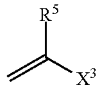

wherein $X^3$ is a non-substituted or substituted alkyl group, aryl group or an alkoxy group; and $R^5$ is a hydrogen atom, Cl, Br, or F, methyl group, alkyl group, aryl group, alkoxy group, ester group, or a carboxylic acid group.

2. The composition of claim 1, wherein:

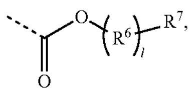

$X^3$ is wherein 1 is 0 or 1;

$R^6$ is a straight alkylene chain or alkoxylene chain having 1 to 25 carbon atoms, which may be substituted by one or more radicals $R^a$, where one or more non-adjacent $CH_2$ groups may be replaced by $R^aC{=}CR^a$, C≡C, $Si(R^a)_2$, $Ge(R^a)_2$, $Sn(R^a)_2$, C=O, C=S, C=Se, $C{=}NR^a$, $P({=}O)(R^a)$, SO, $SO_2$, $NR^a$, OS, or $CONR^a$ and where one or more H atoms may be replaced by D, F, Cl, Br, I, CN or $NO_2$;

$R^7$ is a straight alkylene chain or alkoxylene chain having 1 to 25 carbon atoms, which may be substituted by one or more radicals $R^a$, where one or more non-adjacent $CH_2$ groups may be replaced by $R^aC{=}CR^a$, C≡C, $Si(R^a)_2$, $Ge(R^a)_2$, $Sn(R^a)_2$, C═O, C═S, C═Se, C═$NR^a$, P(═O)($R^a$), SO, $SO_2$, $NR^a$, OS, or $CONR^a$ and where one or more H atoms may be replaced by D, F, Cl, Br, I, CN or $NO_2$; and $R^a$ is at each occurrence, identically or differently, H, D or an alkyl group having 1 to 20 carbon atoms, cyclic alkyl or alkoxy group having 3 to 40 carbon atoms, an aromatic ring system having 5 to 60 carbon ring atoms, or a hetero aromatic ring system having 5 to 60 carbon atoms, wherein H atoms may be replaced by D, F, Cl, Br, I; two or more adjacent substituents $R^a$ here may also form a mono- or polycyclic, aliphatic, aromatic or heteroaromatic ring system with one another.

3. The composition of claim 1, wherein at least a purified (meth)acrylate monomer represented by chemical formula (I) or (II) is used in the composition.

4. The composition of claim 1, wherein the boiling point (B.P.) of said (meth)acrylate monomer of chemical formula (I) and/or chemical formula (II) is 250° C. or more.

5. The composition of claim 1, wherein the viscosity of the composition is 35 cP or less at room temperature.

6. The composition of claim 1, which further comprises one or more members selected from:

another (meth)acylate monomer, optically transparent polymers, anti-oxidants, radical quenchers, photoinitiators, and surfactants.

7. The composition of claim 1, wherein the polymer comprises at least a phosphine group, phosphine oxide group, phosphate group, phosphonate group, thiol group, tertiary amine, carboxyl group, hetero cyclic group, silane group, sulfonic acid, hydroxyl group, phosphonic acid, or a combination of thereof.

8. The composition of claim 1, wherein the composition has an EQE value of 23% or more and less than 95%.

9. The composition according to claim 1, wherein the composition comprises a solvent in an amount of 10 wt % or less based on the total amount of the composition.

10. The composition according to claim 1, wherein the mixing ratio of the (meth)acrylate monomer of chemical formula (I): the (meth)acrylate monomer of chemical formula (II): the polymer is 15:82:3 to 30:60:10.

11. The composition according to claim 1, wherein the total amount of the semiconducting light emitting nanoparticles is in the range from 0.1 wt % to 90 wt % based on the total amount of the composition.

12. The composition of claim 1, wherein the (meth) acrylate monomer represented by chemical formula (I) is selected from the group consisting of 1,9-nonanediol diacrylate, 1,6-hexanediol dimethacrylate, 1,6-hexanediol diacrylate, neopentyl glycol diacrylate, and dipropylene glycol diacrylate.

13. The composition of claim 12, wherein the (meth) acrylate monomer represented by chemical formula (II) is selected from the group consisting of lauryl acrylate and lauryl methacrylate.

14. The composition of claim 13, wherein the (meth) acrylate monomer represented by chemical formula (I) is 1,6-hexanediol dimethacrylate and the (meth)acrylate monomer represented by chemical formula (II) is lauryl acrylate.

15. An electronic device, optical device, sensing device or a biomedical device, comprising the composition according to claim 1.

16. An optical element made from the composition according to claim 1.

17. An optical medium comprising the composition of claim 1 or an optical element made form said composition.

18. An optical device comprising at least the composition of claim 1 or an optical element made from said composition.

19. A method for fabricating an electronic device, optical device or biomedical device, comprising by ink jetting the composition of claim 1 onto a substrate.

* * * * *